//United States Patent [15] 3,645,632
Schmidt et al. [45] Feb. 29, 1972

[54] DEVICE FOR THE ADJUSTMENT OF A RAW-EDGED LENS WITH RESPECT TO AN OUTLINE PATTERN OF ITS MOUNT

[72] Inventors: Wilhelm Schmidt, Aalen; Erwin J. Daniels, Konigsbronn, both of Germany

[73] Assignee: Carl Zeiss Stiftung, Wuerttemberg, Germany

[22] Filed: Sept. 23, 1970

[21] Appl. No.: 74,614

[30] Foreign Application Priority Data

Sept. 26, 1969 Germany ..................... P 19 48 644.3

[52] U.S. Cl. ............................................. 356/165, 356/127
[51] Int. Cl. ........................................................... G01b 9/08
[58] Field of Search ........................... 356/165, 166, 124, 127

[56] References Cited

UNITED STATES PATENTS 2,406,451 8/1946 Borkenstein ........................... 356/166
2,507,138 5/1950 Bliss ....................................... 356/165
3,039,239 6/1962 Banko .................................... 356/166

Primary Examiner—Ronald L. Wibert
Assistant Examiner—Edward S. Bauer
Attorney—Singer, Stern & Carlberg

[57] ABSTRACT

The device of the invention is used for the adjustment of a raw-edged spectacle glass between two supports with respect to an outline pattern conforming to the mount or frame into which the edge-ground spectacle glass is to be fitted. An optical system contains a transparent slidably adjustable scale plate in the plane of which is projected the image of an outline pattern and an image of the spectacle glass, the edge of which is to be ground in accordance with the outline of the outline pattern. The spectacle glass is placed between two supports which engage the two faces of the spectacle glass; the spectacle glass is slidably adjusted between these supports until the image of the spectacle glass appears within the outline of the image of the outline pattern in the plane of the scale plate which is observed by a telescope ocular. The scale plate is provided with a centrally located adjusting mark and two coordinate systems consisting of two sets of uniformly spaced parallel lines.

9 Claims, 5 Drawing Figures

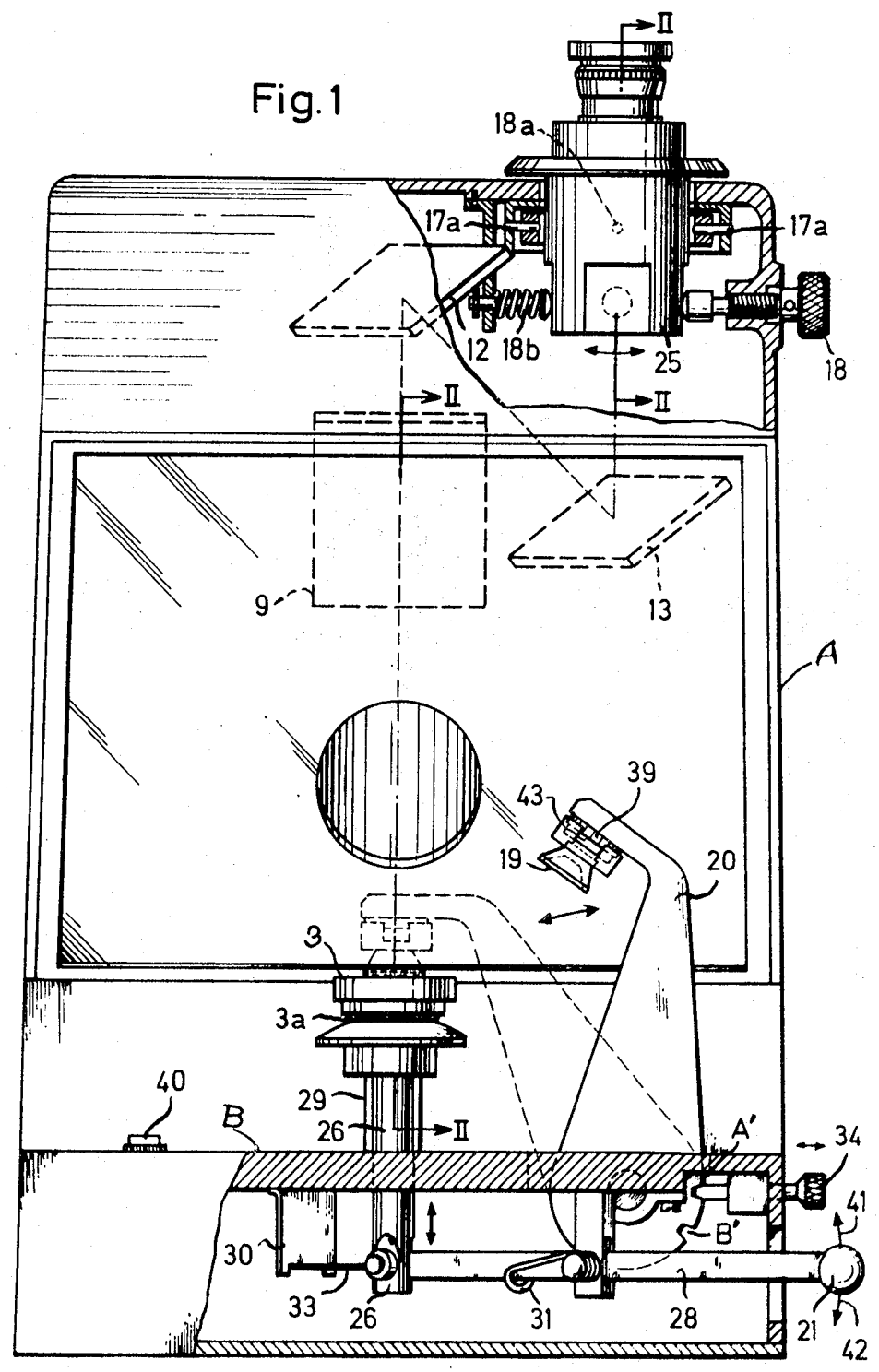

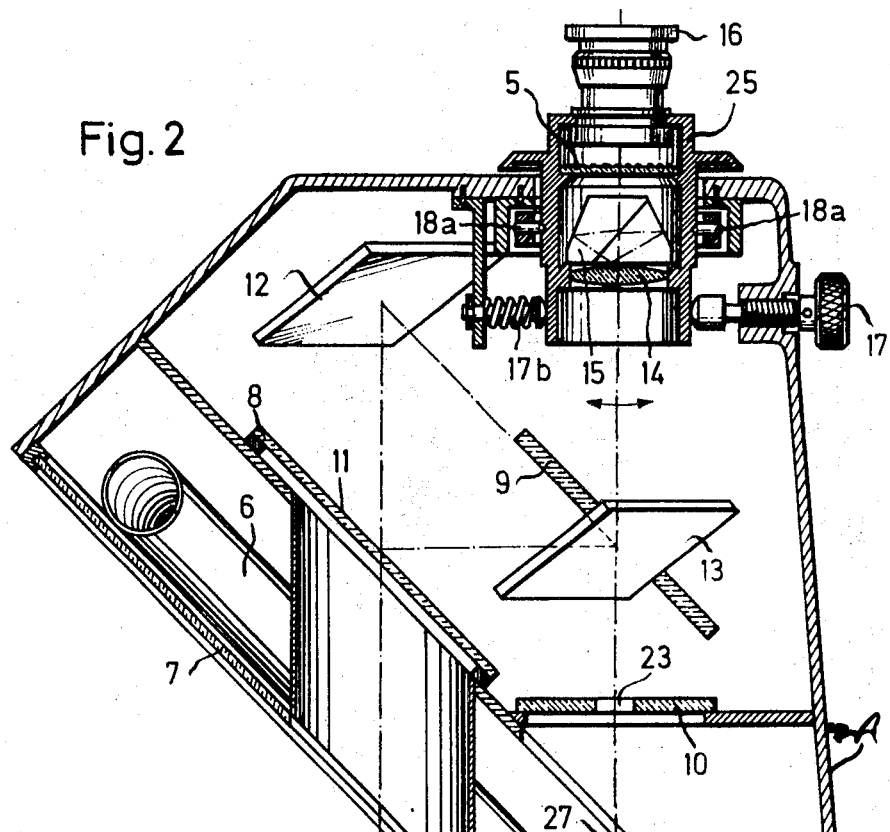
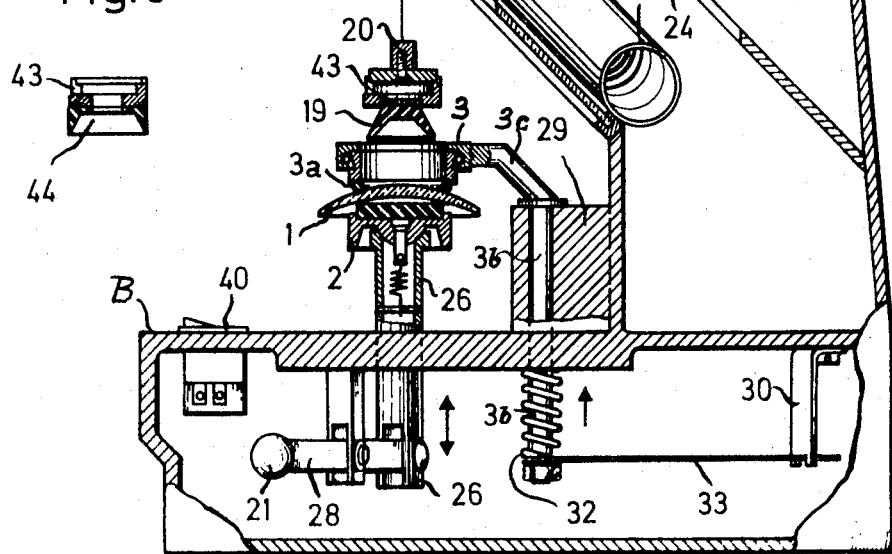

DEVICE FOR THE ADJUSTMENT OF A RAW-EDGED LENS WITH RESPECT TO AN OUTLINE PATTERN OF ITS MOUNT

The invention relates to a device for adjusting a raw-edged lens with respect to an outline pattern of its mount, so that the edge of the lens may be ground to fit into the mount.

The fitting of an optical lens in its mount is accomplished by an edge-finishing operation of the raw-edged lens. When doing this, the necessary exterior shape or outline of the lens is ground in accordance with the shape of an outline pattern and by means of known automatic grinders which operate in accordance with a pattern-copying method. During the edge-finishing operation the lens is held in position by at least two supports which engage the two opposed optical surfaces of the lens. In order to obtain a satisfactory fitting of the lens in its mount, it is necessary that the supports engage the lens surface in accordance with shape-determining measuring values. For instance, when a spectacle glass is to be aligned, it is necessary that the center points of the same are positioned in accordance with a predetermined optical spectacle fitting with respect to the eyes of the spectacle wearer.

A device is known in which the spectacle glass to be ground, in order to fit its mount, is connected with a coupling member by casting or suction in such a manner that a marked point on the lens coincides with the axis of rotation of the coupling member and that a predetermined angle orientation of a lens diameter is maintained with respect to an outline pattern. The glass with its coupling member is then clamped into a grinding device which grinds the edge of the lens in accordance with the shape of the outline pattern. This known device has, however, the disadvantages that a marking of said glass in accordance with a preceding marking in the vertex refraction meter has to take place with a special device prior to the attachment of the coupling member.

Additional devices are known in which said second marking which is obtained in accordance with a preceding marking and is accompanied by additional errors is avoided. In these devices a graduation with crosslines is reflected by a partly reflecting surface into a plane between the eye of the observer and the spectacle glass to be centered. This graduation in one known device may be slidably adjusted in two directions which are perpendicular to one another, namely in accordance with scales and measurements in relation to the center of the pattern and which were determined during the fitting of the spectacles to the eyes of the spectacle carrier. For the determination of whether it is possible to grind the spectacle glass in accordance with a predetermined outline pattern, the known devices may arrange the outline pattern in rear of the graduation and may reflect the same into the observation path of rays.

It is a disadvantage of these known devices that the outline pattern, graduation, and the spectacle glass are only then clearly noticeable when their brightness and colors are carefully coordinated to each other. This, however, is in practice not very often obtainable because the mount or spectacle frame manufacturers produce their outline patterns for the purpose of characterization in different colors. The coordination is particularly critical in view of the fact that the spectacle glass comprising transparent body does not furnish any substantial contrast, but has to be clearly visible next to the outline pattern and the measuring graduation in order that the measuring method may be performed.

An object of the present invention is a centering device which eliminates the disadvantages of the known devices, which permits an easy alignment of the lens to be mounted and increases the accuracy of the centering procedure.

The invention relates to a device for the adjustment of a raw-edged lens with respect to an outline pattern of its mount and for the attachment of a coupling member to one of the two optical faces of the lens. The device is distinguished by the employment of an optical system which simultaneously performs a projection of the lens and the outline pattern, which is spaced from the lens, into the plane of a transparent slidable scale, whereby the scale is illuminated by the projection path of rays in the direction of observation, and that an attachable coupling member is provided which after the completion of the adjustment procedure is so connected with the lens that its axis extends through the center of rotation of the outline pattern.

As a result of the simultaneous projection of the spectacle glass and the outline pattern into the plane of the scale a parallax-free alignment of the scale in accordance with the outline pattern as well as of the lens in accordance with the scale is possible.

A particular advantage of the invention is that the device is so constructed that an illumination system may be employed which predominately illuminates the transparent outline pattern in transillumination, while the lens is predominately illuminated by top illumination. Since the outline patterns are made almost all of a material which is more or less not or only little transparent, these patterns appear independent of their color in the device of the invention principally as a shadow effect.

For increasing the contrast, a color filter may be inserted into the path of rays which contains the outline pattern and/or the lens. These filters may consist of solidly colored glass or are employed in the form of interference filters or also as combination filters. It is also possible to construct the device in such a manner that the color filters may be pivotally moved into and away from the path of rays at any desired time.

In view of the color filter arranged in the path of rays of the outline pattern between the source of light and the partly reflecting surface the operator will recognize the surrounding area of the outline pattern as a dark area, while the outline pattern itself appears dark and colorless.

The optical surfaces of the lens to be centered in view of the diffused top illumination reflect light into the optical system. The lens which with its peripheral portions extends beyond the dull black background is clearly visible to the operator in the form of a clearly defined milky area. For increasing of the contrast a color filter is arranged in the path of rays which contains the lens between the source of light and the partly reflecting surface and this filter is distinguished from the filter arranged in the path of rays in which the outline pattern is arranged.

The optical system of the device of the invention is provided with a partly reflecting surface which combines the light coming from the outline pattern and the lens. It is advisable that this partly reflected surface is also constructed as an interference layer, and therefore, produces a color filter.

The light coming from the outline pattern and the lens is directed onto the transparent scale so that the operator is able to observe the scale, the outline pattern, and the lens.

The device of the invention and its operation will now be described with reference to the accompanying drawing in which:

FIG. 1 illustrates a front elevation view of the device with portions shown in section;

FIG. 2 is a side elevation view of the device likewise with portions shown in section;

FIG. 5 illustrates a sectional view of a mold which may be used in place of the coupling member attachable to the spectacle glass.

Figure 3:
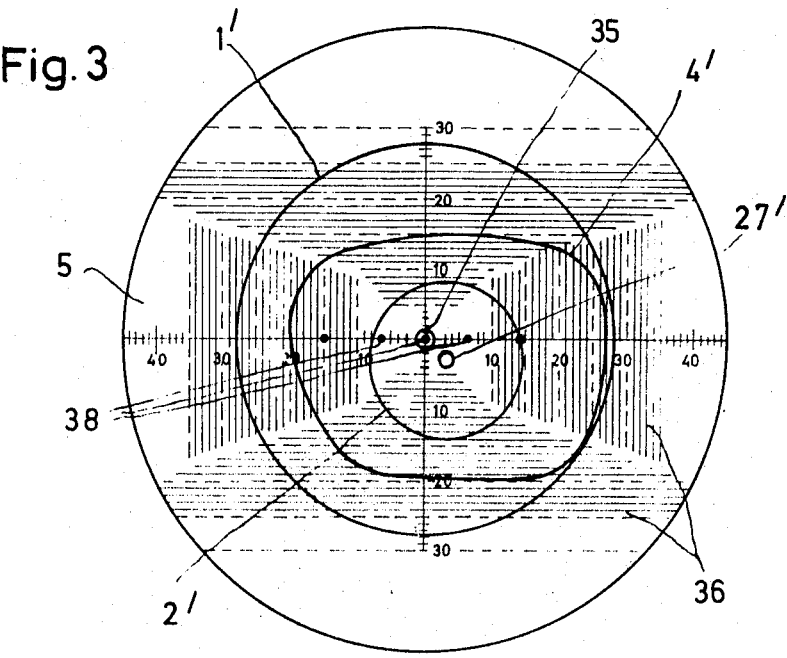
FIG. 3 illustrates the viewing area of the device in which the spectacle glass is disposed somewhat off center with respect to the outline pattern.

Referring to the FIGS. 1 and 2, the upright housing A of the device is provided with a lower horizontal extension B provided with means for supporting the spectacle glass 1 which is arranged slidably and adjustably between a lower support member 2 and an upper annular support member 3 having a rubber ring 3a attached thereon. The housing A contains an outline pattern 4 of the spectacle mount or frame, while the telescope mount 25 at the upper end of the housing has disposed therein a slidable transparent scale 5. The illuminating system of the device is arranged in the housing A above the extension B and comprises an annular light 6 in front of which is arranged an inclined dispersion plate 7. The annular light 6 serves for the illumination of the working place formed by the horizontal extension B of the housing A and also for providing a diffused top illumination of the spectacle glass 1 by means of the dispersion plate 7. The annular light 6 is also used for transillumination of the outline pattern 4. A switch 40 on the extension B serves for connecting and disconnecting the annular light 6.

An inclined and partly reflecting surface 8 is arranged above and parallel to the light 6. On this surface 8 is combined the light coming from the outline pattern 4, which light is reflected by the mirror 9 and the light coming from the spectacle glass 1. A color filter 10 arranged in spaced relation to the outline pattern 4 above the same and is used for increasing the contrast. Another color filter 11 is disposed in the path of the light coming from the spectacle glass 1 and has the form of an interference layer which is applied to the upper surface of the partly reflecting plate 8. The transmission ranges of the color filters 10 and 11 are different from one another. For instance, the filter 10 is so constructed that it transmits red light.

The filter 10 is provided with a central aperture 23. Below the outline pattern 4 is arranged another color filter 24 which transmits, for instance, green light. This color filter 24 covers at least the apertured center of rotation 27 of the outline pattern. Therefore, the operator of the device who looks into the telescope ocular will observe in the focused observation system that the outline pattern 4 appears as a dark shadow, while the center of rotation of the outline pattern appears as a green spot. The area surrounding the image of the outline pattern will appear in a red color.

The mirrors 12 and 13 which are arranged within the housing A of the device are used for the purpose of shortening the path of rays and accordingly permit a shortened type of construction of the entire device. The mount 25 arranged at the upper end of the casing is equipped with a telescopic lens 14 above which is disposed a reversing prism 15, so that an intermediate image of the spectacle glass 1 and of the outline pattern 4 is produced in the plane of the transparent scale 5. This intermediate image and the scale are observed by the operator through the telescope ocular 16. Adjusting screws 17 and 18 serve for tilting of the mount 25 in the two coordinate directions. Accordingly, the scale 5 may be slidably adjusted toward the edge of the outline pattern 4 or toward the center of rotation 27 of the outline pattern 4. The numeral 19 designates a coupling member, for instance a rubber suction cup. In place of the rubber suction cup 19 may also be employed a mold for casting a coupling member onto the surface of the spectacle glass 1. Such a mold is illustrated in FIG. 5. The coupling member or the mold are mounted on one end of a lever 20 which is pivotally mounted in a vertical plane and is adapted to be arrested in the positions A' and B' by means of a manually operable locking pin 34. After the lever 20 has been moved into the position B' in which the coupling member 19 is disposed above the spectacle glass, a lever knob 21 on a horizontally disposed lever 28, which is pivotally supported between its ends, is actuated to produce a connection of the coupling member 19 with the spectacle glass 1. In FIG. 2, the pivoted lever 20 is illustrated only partially in order to keep the drawing clear.

Figure 4:
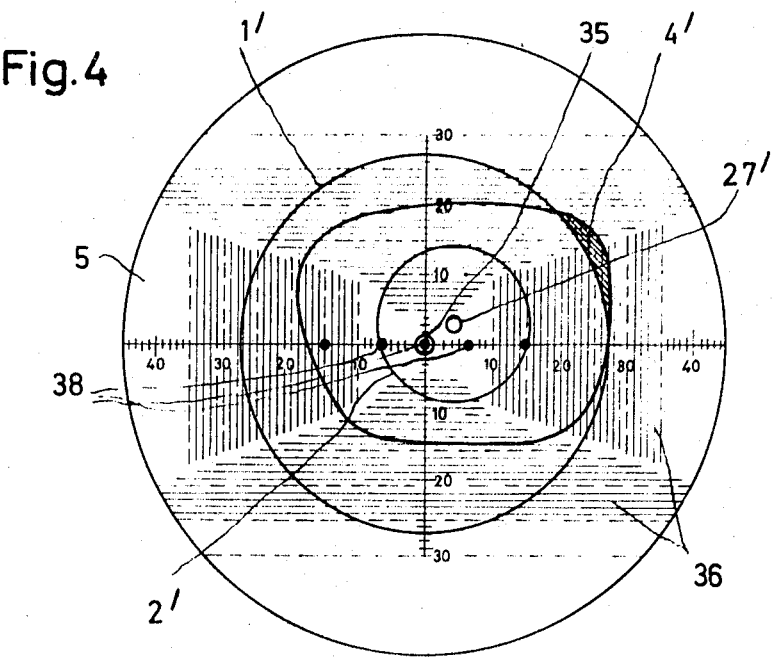
FIG. 4 illustrates the viewing area of the device with a much more pronounced decentralized arrangement of the spectacle glass with respect to the outline pattern.

The operation of the device of the invention is as follows;

At first, the annular lamp 6 is caused to light up by closing the switch 40. The operator then looks into the telescope ocular 16 and will be able to observe the scale 5 which, as illustrated in FIGS. 3 and 4, is provided with an adjusting mark 35 and with uniformly spaced straight parallel lines 36 extending in both coordinate directions. Now the outline pattern 4 is inserted into the device, for instance, by means of a slide or the like, and as a result of the transillumination of the transparent outline pattern 4, the latter appears in a color which varies between gray and black, while the surrounding area and the center of rotation 27' which latter forms at the same time the center of rotation of the machine appears very bright. As a result of the color filter 10 the surrounding area appears red, while the center of rotation 27' owing to the arrangement of the color filter 24 appears in a green color. By a rotation of the screws 17 and 18, which are arranged at a right-angle with respect to one another, the telescope mount 25 and therewith the scale 5 are tilted about the suspensions 17a and 18a and after adjustment the mount is retained in the desired position by the counter springs 17b and 18b.

In the position A' of the lever 20 the spectacle glass 1 is placed upon the lower support 2 which is arranged on a vertically adjustable post 26. For this purpose, the lever button 21 on the lever 28 is raised somewhat in the direction of the arrow 41 (FIG. 1), so that the support 2 is moved downwardly. After the insertion of the spectacle glass 1 one permits the lever 28 to return to its original substantially horizontal position and the spectacle glass 1 is now held in the desired position by forces acting on the support 2 and on the upper support ring 3. These forces are supplied by the spring 31 (FIG. 1) and the spring 32 (FIG. 2), respectively. In other words, the spectacle glass is clamped between the lower support 2 and the upper ring 3. The horizontally disposed upper ring 3 is connected by an inclined arm 3c with the upper end of a vertical post 3b mounted for longitudinal adjustment in a bearing block 29 on the lower portion of the housing A and having its lower end surrounded by the spring 32.

The operator when looking into the ocular 16 will observe an image 1' of the spectacle glass 1 as a somewhat milky area which is colored as the result of the color filter 11. The operator will also notice the optical center points arranged on the spectacle glass 1, which for instance in FIG. 3, are designated by 38. These points 38 appear very clearly since the same, owing to the brighter support image 2' appear with sufficient contrast. The spectacle glass 1 is now manually slidably adjusted until, for instance, the centrally arranged reference point 38 on the spectacle glass 1, is in alignment with the adjusting mark 35 of the scale 5. After this adjusted position has been established, the operator can very easily judge whether the perimeter of the spectacle glass 1 to be ground can be produced by employing a predetermined pattern. According to the example illustrated in FIG. 3, the spectacle glass 1 may be produced without any difficulties by an outline pattern 4 producing the image 4' because the image 4' is within the image 1'. In the example illustrated in FIG. 4, however, a small area of the image 4' of the outline pattern 4 extends beyond the outline of the image 1' of the spectacle glass 1. This will indicate to the operator that the particular spectacle glass 1 for the illustrated decentrallization is not of sufficient size and that for this reason the desired outline pattern cannot be produced from the particular spectacle glass inserted in the device. In the FIGS. 3 and 4 the image 2' is that of the support 2.

After the adjusting procedure has been completed and one has determined that it is possible to produce from the inserted spectacle glass 1 a shape which corresponds to the outline pattern 4, then the operator of the device swings the pivoted lever 20 into the position B' and then the lever button 21 is moved downwardly in the direction of arrow 42 so that the spectacle glass 1 comes into engagement with the coupling member 19 or the mold illustrated in FIG. 5. During this procedure the power of the spring 32 is overcome and the upper annular support 3 is raised. A horizontal leaf spring 33 engaged by a yoke 30 prevents any lateral rotative movement of the annular support 3. According to FIG. 2 the axis of the coupling member 19 extends through the center of rotation 27 of the outline pattern; herewith is assured that the coupling member 19 engages the spectacle glass 1 in the correct position.

In the event that the rubber suction cup 19 is replaced by a mold 44 which is to be used as a coupling member, the mold 44 illustrated in FIG. 5 is attached to the guide pin 39 on the lever 20 and the latter is lowered onto the lens 1. A liquid metal alloy is then poured into the aperture 43 and onto the upper surface of the lens so that the entire cavity of the mold is filled and adheres to the lens.

What we claim is:

1. Device for the adjustment of a raw-edged lens with respect to an outline pattern conforming to the lens mount and for the attachment of a coupling member to one of the two optical faces of said lens, said device comprising an optical system including within an optical path transparent slidable scale therein, an illuminating means, means for supporting a raw-edged lens, an outline pattern having a center point of rotation, said outline pattern being arranged in spaced relation to said lens when the latter is placed on said supporting means, said optical system simultaneously producing in the plane of said scale an image of said lens on said support and also an image of said outline pattern, said scale being illuminated by said illuminating means in the direction of observation, and means for bringing said coupling member after adjustment of said lens in engagement with said lens on said support in such a manner that the axis of said coupling member extends through the center point of rotation of said outline pattern.

2. Device according to claim 1, in which said scale comprises an adjusting mark (35) and uniformly spaced parallel lines extending in the directions of both coordinates, and means for movably adjusting said scale in both of said directions.

3. Device according to claim 1, in which said illuminating means illuminates said outline pattern predominately in transillumination and said lens predominately with top illumination.

4. Device according to claim 1, including a color filter (10) arranged in that portion of the pack of rays of said illuminating means in which said outline pattern is arranged, said filter being disposed between said illuminating means (6) and a partly reflecting surface (8).

5. Device according to claim 1, including a partly reflecting surface (8) arranged in said optical system, said partly reflecting surface combining the light coming from the outline pattern and from said lens on said supporting means and being constructed as an interference layer.

6. Device according to claim 5, including a color filter (11) disposed in said optical path in that portion of the path of rays of said illuminating means in which the lens is arranged, said filter being disposed between said illuminating means (6) and said partly reflecting surface (8), whereby the transmission range of said color filter (11) differs from that of the color filter (10) which is arranged in said optical path in that portion of the path of rays in which said outline pattern is disposed.

7. Device according to claim 1, including a rotatable and exchangeable support between which said supporting means and said raw-edged lens is slidably supported, said rotatable and exchangeable support comprising a pivotally mounted lever carrying at one end a coupling member for engaging one face of the lens placed on said supporting means, said lens being relatively slidable with respect to said coupling member.

8. Device according to claim 7, in which said coupling member comprises a rubber suction cup.

9. Device according to claim 7, in which said coupling member comprises a mold.

* * * * *